United States Patent
Kuri

(10) Patent No.: US 11,293,877 B2
(45) Date of Patent: Apr. 5, 2022

(54) DEFECT DETECTING DEVICE AND DEFECT DETECTING METHOD

(71) Applicant: SEIKO EPSON CORPORATION, Tokyo (JP)

(72) Inventor: Ryohei Kuri, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/713,835

(22) Filed: Dec. 13, 2019

(65) Prior Publication Data

US 2020/0191723 A1 Jun. 18, 2020

(30) Foreign Application Priority Data

Dec. 14, 2018 (JP) .............................. JP2018-234128

(51) Int. Cl.
*G01N 21/88* (2006.01)
*G01N 21/55* (2014.01)

(52) U.S. Cl.
CPC ......... *G01N 21/8806* (2013.01); *G01N 21/55* (2013.01); *G01N 2021/8845* (2013.01); *G01N 2021/8854* (2013.01)

(58) Field of Classification Search
CPC ... G01N 2021/8845; G01N 2021/8854; G01N 21/55; G01N 21/8806; G01N 2021/8874
See application file for complete search history.

(56) References Cited

U.S. PATENT DOCUMENTS

| 2004/0146295 A1* | 7/2004 | Furman ............ G01N 21/95607 398/9 |
| 2006/0164649 A1* | 7/2006 | Rosengaus ............ G01J 3/0224 356/450 |
| 2010/0091272 A1 | 4/2010 | Asada et al. |
| 2011/0239748 A1 | 10/2011 | Weon et al. |
| 2018/0259394 A1* | 9/2018 | Gotoh ..................... G01J 3/504 |
| 2020/0309600 A1* | 10/2020 | Yamamoto ............ G01J 3/0289 |

FOREIGN PATENT DOCUMENTS

| JP | 2010-094214 A | 4/2010 |
| JP | 2010-112941 A | 5/2010 |
| JP | 2011-220995 A | 11/2011 |
| JP | 2011-226814 A | 11/2011 |

* cited by examiner

*Primary Examiner* — Deoram Persaud
(74) *Attorney, Agent, or Firm* — Oliff PLC

(57) ABSTRACT

A defect detecting device includes an illumination that irradiates a measuring object with illumination light, an imager that images the illumination light reflected by the measuring object, and a detector that detects a defect at a surface of the measuring object based on a captured image obtained by imaging the illumination light by the imager. The captured image includes a plurality of spectral images having different spectral wavelengths, and the detector detects a diffuse reflection region by which the illumination light is diffusely reflected based on the plurality of spectral images, and determines a size of the defect based on the spectral wavelength of the spectral image in which the diffuse reflection region is detected.

9 Claims, 7 Drawing Sheets

DEFECT DETECTING DEVICE AND DEFECT DETECTING METHOD

The present application is based on, and claims priority from JP Application Serial Number 2018-234128, filed Dec. 14, 2018, the disclosure of which is hereby incorporated by reference herein in its entirety.

BACKGROUND

1. Technical Field

The present disclosure relates to a defect detecting device and a defect detecting method.

2. Related Art

In the related art, a defect detecting device for detecting defects such as irregularities and foreign matters existing at a surface of a measuring object is known example, JP-A-2011-226814).

The defect detecting device disclosed in JP-A-2011-226814 irradiates a measuring object with light from an illumination unit and images the light reflected by a surface of the measuring object with an imaging unit. The measuring object is irradiated with the light emitted from the illumination unit through an illumination unit filter. The illumination unit filter has a first filter and a second filter. The first filter is a filter in which a region that blocks light of a first wavelength and a region that transmits the first wavelength are alternately formed in a first period. The second filter is a filter in which a region that blocks light of a second wavelength different from the first wavelength and a region that transmits the second wavelength are alternately formed in a second period different from the first period. In this defect detecting device, an image captured by the imaging unit is separated into an image of light components of the first wavelength and an image of the light components of the second wavelength to detect a defect on the surface of the measuring object.

However, with the defect detecting device and the defect detecting method of the related art disclosed in JP-A-2011-226814, the minimum size of a defect that can be detected is a pixel unit in the imaging unit. That is, when there is a defect smaller than a pixel, it is possible to detect the position of the defect by detecting abnormality in the pixel signal value, but the size of the defect cannot be measured.

SUMMARY

A defect detecting device according to a first application example includes an illumination unit that irradiates a measuring object with illumination light, an imaging unit that images the illumination light reflected by the measuring object, and a detection unit that detects a defect at a surface of the measuring object based on a captured image obtained by imaging the illumination light by the imaging unit, in which the captured image includes a plurality of spectral images having different spectral wavelengths, and the detection unit detects a diffuse reflection region by which the illumination light is diffusely reflected based on the plurality of spectral images, and determines a size of the defect based on the spectral wavelength of the spectral image in which the diffuse reflection region is detected.

In the defect detecting device according to the application example, the illumination unit may irradiate the measuring object with the illumination light including light components of a plurality of the spectral wavelengths, and the imaging unit may include a spectral element that transmits light of a predetermined wavelength and is configured to change the wavelength of the transmitted light and an imaging element that receives the light transmitted through the spectral element, and image the plurality of spectral images corresponding to the plurality of spectral wavelengths by switching the wavelength of the light transmitted through the spectral element to the plurality of spectral wavelengths.

In the defect detecting device according to the application example, the illumination unit may irradiate the measuring object with the illumination light of which the wavelength is switched to the plurality of spectral wavelengths, and the imaging unit may capture the plurality of spectral images corresponding to the plurality of spectral wavelengths by imaging the illumination light reflected by the measuring object each time the wavelength of the illumination light emitted from the illumination unit is switched.

In the defect detecting device according to the application example, the detection unit may detect the diffuse reflection region by performing an edge detection process on each spectral image and generate a composite image in which the plurality of spectral images are superimposed and a display form of the diffuse reflection region is changed according to the size of the defect.

In the defect detecting device according to the application example, the imaging unit may be disposed at a position separated from a specular reflection direction in which the illumination light from the illumination unit is specularly reflected by the measuring object.

In the defect detecting device according to the application example, the illumination unit may be a ring illumination formed in an annular shape.

In the defect detecting device according to the application example, the illumination unit may be a diffuse illumination that irradiates the measuring object with diffused light.

A defect detecting method according to a second application example includes an illumination step of irradiating a measuring object with illumination light, an imaging step of imaging the illumination light reflected by the measuring object, and a detection step of detecting a defect at a surface of the measuring object based on the captured image, in which, in the imaging step, the captured image including a plurality of spectral images having different spectral wavelengths is imaged, and, in the detection step, a diffuse reflection region by which the illumination light is diffusely reflected is detected based on the plurality of spectral images, and a size of the defect is determined based on the spectral wavelength of the spectral image in which the diffuse reflection region is detected.

DESCRIPTION OF EXEMPLARY EMBODIMENTS

First Embodiment

Hereinafter, the first embodiment will be described.
Overall Configuration of Defect Detecting Device 100

Figure 1:
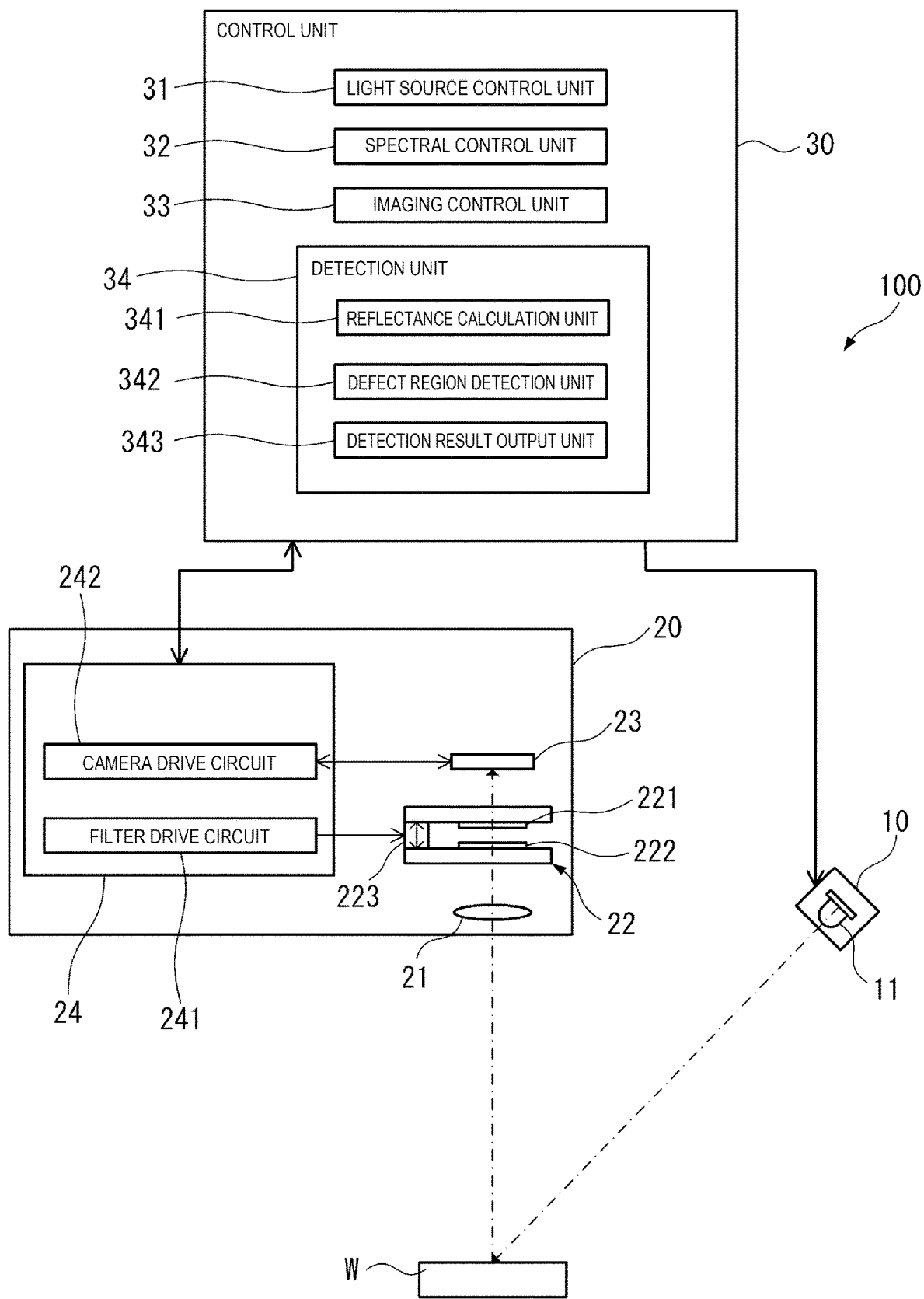
FIG. 1 is a schematic diagram showing a schematic configuration of a defect detecting device according to a first embodiment.

FIG. 1 is a schematic diagram showing a schematic configuration of a defect detecting device 100 according to the first embodiment.

As shown in FIG. 1, the defect detecting device 100 includes an illumination unit 10, an imaging unit 20, and a control unit 30 which controls the illumination unit 10 and the imaging unit 20.

The defect detecting device 100 is a device that measures a quantity of a defect at a surface of a measuring object W. The defect described here refers to a defect which includes a minute scratch at the surface of the measuring object W, a minute foreign matter attached to the surface of the measuring object W, or the like, and causes minute irregularities at the surface of the measuring object W.
Configuration of Illumination Unit 10

The illumination unit 10 has a light source 11, and the light source 11 irradiates the measuring object W with illumination night of a predetermined emission wavelength range.

In the defect detecting device 100 of the present embodiment, a defect is detected by detecting illumination light diffusely reflected by the defect at the surface of the measuring object W. Although details will be described later, whether or not the light is diffusely reflected by the defect depends on the relationship between the size of the defect and the wavelength of the illumination light. Therefore, the light source 11 emits illumination light including light components having a plurality of wavelengths corresponding to the size of the defect to be detected. For example, when detecting a defect having a size of 50 nm to 100 nm, the light source 11 having a visible light region of 400 nm to 800 nm as an emission wavelength range is used.

In the present embodiment, as shown in FIG. 1, in the defect detecting device 100, the illumination unit 10 irradiates the surface of the measuring object W with the illumination light at an angle of 45°. In FIG. 1, the number of the illumination units 10 is one, but two or more illumination units 10 may be provided.
Configuration of Imaging Unit 20

The imaging unit 20 images the illumination light reflected by the measuring object W, that is, images the measuring object W irradiated by the illumination light. The imaging unit 20 is provided in the normal direction of the surface of the measuring object W and images the illumination light reflected from the measuring object W in the normal direction. That is, the imaging unit 20 is provided at a position separated from the specular reflection direction of the illumination light.

As shown in FIG. 1, the imaging unit 20 of the present embodiment includes an incident optical system 21, a spectral filter 22, an imaging element 23, and a driver circuit 24.

The incident optical system 21 is configured of a telecentic optical system, for example, and guides the illumination light reflected by the measuring object W to the imaging element 23 via the spectral filter 22.

The spectral filter 22 is a spectral element which spectrally divides light having a predetermined wavelength from the illumination light reflected by the measuring object W and outputs it to the imaging element 23. The spectral filter 22 is configured to be able to switch the wavelength of light to be spectrally divided into a plurality of wavelengths. For example, in the present embodiment, the spectral filter 22 includes a Fabry-Perot etalon element including a pair of reflective films 221 and 222 facing each other and a gap changing unit 223 that can change the distance between the pair of reflective films 221 and 222. As the gap changing unit 223, for example, an electrostatic actuator or the like can be used. In such a Fabry-Perot etalon element, by controlling the voltage applied to the gap changing unit 223, it is possible to change the wavelength of the light transmitted through the spectral filter 22 by changing the gap dimension between the pair of reflective films 221 and 222.

The imaging element 23 is a device that images the image light transmitted through the spectral filter 22, and includes an image sensor such as a charge coupled device (CCD) or a complementary metal oxide semiconductor (CMOS).

The driver circuit 24 includes a filter drive circuit 241 that drives the spectral filter 22 and a camera drive circuit 242 that drives the imaging element 23.

Based on the command signal from the control unit 30, the filter drive circuit 241 applies a drive voltage to the gap changing unit 223 of the spectral filter 22, and transmits the illumination light having a predetermined spectral wavelength through the spectral filter 22.

The camera drive circuit 242 includes an I-V conversion circuit, an amplification circuit, an AD conversion circuit, a field-programmable gate array (FPGA), and the like. The I-V conversion circuit converts the charge signal input from each pixel of the imaging element 23 to a voltage signal. The amplification circuit amplifies the voltage of the voltage signal output from the I-V conversion circuit. The amplification circuit configured of an inverting amplification circuit or a non-inverting amplification circuit using an operational amplifier, and is configured to be capable of gain switching using an element such as a multiplexer. For example, the gain of the amplification circuit is configured to be switchable between eight types of 1×, 2×, 4×, 8×, 16×, 24×, 32×, and 50×.

The AD conversion circuit converts the analog voltage signal output from the amplification circuit to a digital voltage signal.

The FPGA performs data process on the voltage signal of each pixel input from the imaging element 23 via the I-V conversion circuit, the amplification circuit, and the AD conversion circuit, generates an image data of the captured image, and outputs the image data to the control unit 30. In the present embodiment, the imaging unit 20 switches the wavelength of the illumination light transmitted through the spectral filter 22 into a plurality of spectral wavelengths, and the imaging element 23 captures a plurality of spectral images corresponding to the plurality of spectral wavelengths. Therefore, the FPGA outputs a captured image including plurality of spectral images captured by the imaging element 23 to the control unit 30.

Configuration of Control Unit 30

The control unit 30 is coupled to the illumination unit 10 and the imaging unit 20 and controls the illumination unit 10 and the imaging unit 20 to perform the defect detection process for the surface of the measuring object W.

The control unit 30 includes a storage device that stores various data and various programs and a calculation circuit that performs various processes by reading and executing the programs stored in the storage device. Then, the control unit 30 functions as a light source control unit 31, a spectral control unit 32, an imaging control unit 33, and a detection unit 34 as shown in FIG. 1 as the calculation circuit reads and executes the programs stored in the storage device.

The light source control unit 31 controls turning on and off of the light source 11 of the illumination unit 10.

The spectral control unit 32 controls the drive of the spectral filter 22 of the imaging unit 20. In the present embodiment, a drive table that indicates the relationship between the spectral wavelength of light transmitted through the spectral filter 22 and the voltage applied to the gap changing unit 223 is stored in the storage device. The spectral control unit 32 outputs a command signal for instructing the voltage applied corresponding to the spectral wavelength of the illumination light transmitted through the spectral filter 22 to the filter drive circuit 241. At this time, the spectral control unit 32 sequentially switches the wavelength of the illumination light transmitted through the spectral filter 22 into a plurality of preset spectral wavelengths. Here, an example in which the drive table is stored in the storage device of the control unit 30 is described, but the driver circuit 24 may be provided with a storage unit such as a memory to store the drive table.

The imaging control unit 33 controls the drive of the imaging element 23 of the imaging unit 20. That is, the imaging control unit 33 instructs the camera drive circuit 242 about the imaging timing of the captured image by the imaging element 23.

As described above, in the present embodiment, the spectral control unit 32 sequentially switches the spectral wavelength of the spectral filter 22. The imaging control unit 33 obtains a spectral image corresponding to each spectral wavelength by instructing aging by the imaging element 23 after the spectral wavelength is switched by the spectral filter 22.

The detection unit 34 detects a defect of the measuring object W based on the plurality of spectral images captured by the imaging unit 20. Specifically, the detection unit 34 functions as a reflectance calculation unit 341, a defect region detection unit 342, and a detection result output unit 343.

The reflectance calculation unit 341 converts the signal value of each pixel into reflectance for each spectral image corresponding to the plurality of imaged spectral wavelengths. That is, the signal value of each pixel of each spectral image imaged by the imaging unit 20 is a gradation value of 256 gradations according to the amount of light received by the imaging element 23 and is converted into reflectance based on a reference value obtained by measuring the gradation value in advance.

The defect region detection unit. 342 detects the position of the defect in the measuring object W and the size of the defect (defect size) based on the spectral image obtained by converting the signal value of each pixel into reflectance. In the present embodiment, the defect region detection unit 342 performs the edge detection process on each spectral image and detects the pixel in the detected edge region as a pixel in which a defect exists. As an edge detection method, a known tech e can be used. For example, an edge detection method such as a Sobel method, a Laplace method, or a Canny method can be used.

The pixel in the edge region detected by the edge detection for each spectral image is a pixel in which the difference in reflectance with a surrounding pixel is equal to or larger than a predetermined threshold. This indicates that, in the measuring object W, it is a diffuse reflection region in which the amount of light incident on the imaging element 23 is increased due to diffuse reflection of the illumination light.

Here, the defect size and the illumination light reflected by the surface of the measuring object W when the defect exists at the surface of the measuring object W will be described.

Figure 2:
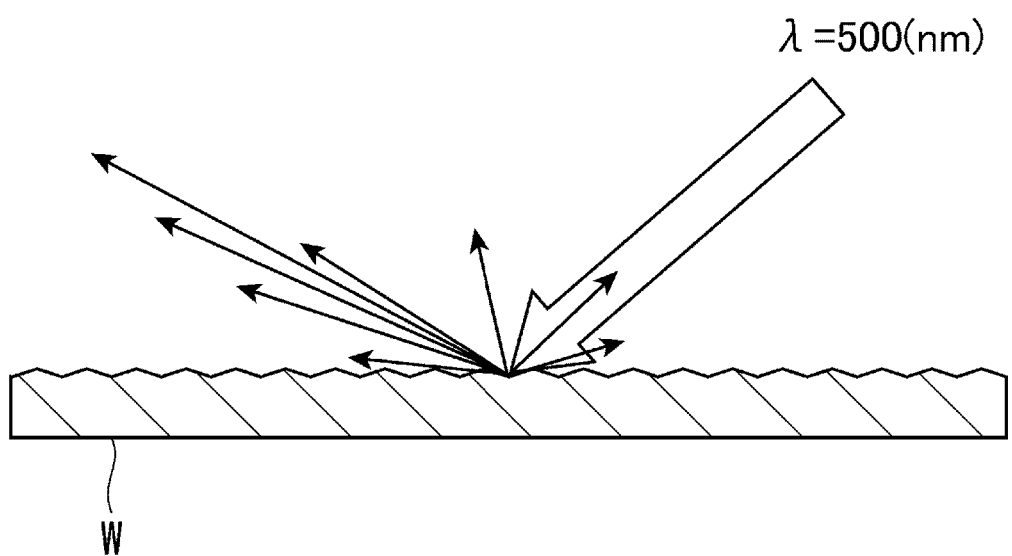
FIG. 2 is a schematic diagram when irradiating a 100 nm defect existing at a measuring object with illumination light having a wavelength of 500 nm.
Figure 3:
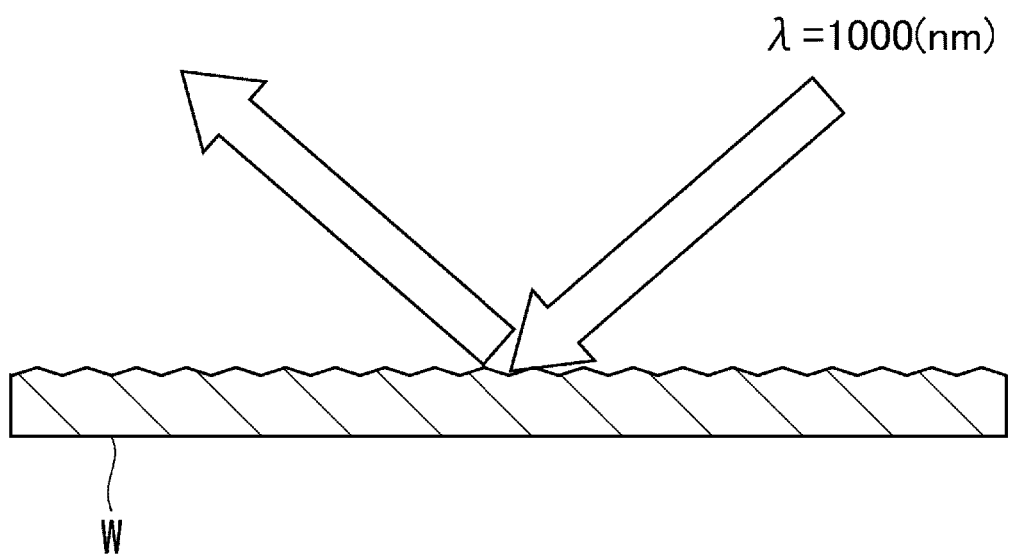
FIG. 3 is a schematic diagram when irradiating a 100 nm defect existing at a measuring object with illumination light having a wavelength of 1,000 nm.

FIG. 2 is a schematic diagram when irradiating a 100 nm defect existing at the measuring object W with illumination light having a wavelength of 500 nm. FIG. 3 is a schematic diagram when irradiating a 100 nm defect existing at the measuring object W with illumination light having a wavelength of 1,000 nm.

When a defect exists at the surface of the measuring object W, illumination light having a wavelength less than a predetermined wavelength is diffusely reflected at the defect, and illumination light having a wavelength equal to or longer than the predetermined wavelength is specularly reflected at the defect. For example, in the example of FIGS. 2 and 3, when a 100 nm defect at the measuring object W is irradiated with illumination light having a wavelength of 1,000 nm, the illumination light is specularly reflected. However, when the defect is irradiated with illumination light having a wavelength of 500 nm, the illumination light is diffusely reflected.

In general, the relationship between the standard deviation $R_h$ of the surface roughness of the measuring object W and the wavelength of the illumination light specularly reflected by the measuring object W is expressed by the following equation (1) (reference: Nobukatsu Takai, "Surface Roughness Measurement by Laser Light Scattering", Journal of Japan Society for Precision Engineering, Japan Society for Precision Engineering, Sep. 5, 1998, Vol. 64, No. 9, pp. 1304-1307).

$$0 < R_h < \lambda/8 \tag{1}$$

That is, when the measuring object W is irradiated with the illumination light having the wavelength $\lambda$, diffuse reflection occurs in the defect having the standard deviation $R_h$ of the surface roughness of $\lambda/8$ or more, which can be observed by the imaging unit 20.

In the present embodiment, as described above, an edge detection process is performed on a spectral image corresponding to the plurality of spectral wavelengths to detect the position of the defect, so that the defect size of each defect can be determined at the same time.

The detection result output unit 343 outputs each defect region detected by the defect region detection unit 342. The defect output method of the detection result output unit 343 is not particularly limited. For example, a diffuse reflection region obtained by each spectral image is color-coded for each spectral wavelength and a composite image is generated and output.

Defect Detecting Method Using Defect Detecting Device 100

Next, a defect detecting method using the above-described defect detecting device 100 will be described.

Figure 4:
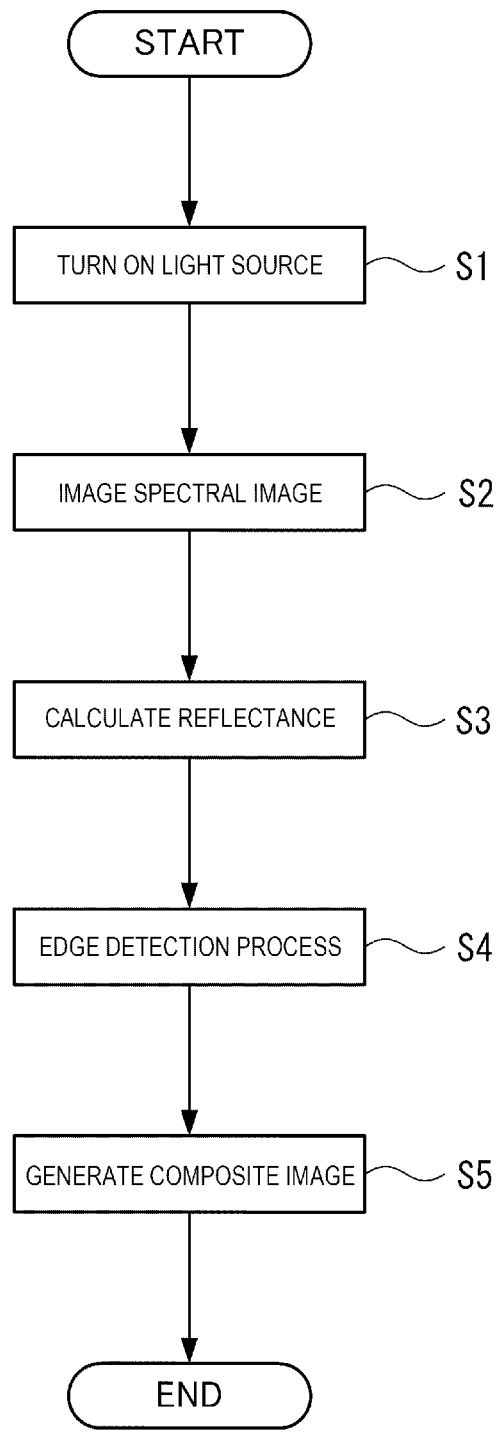
FIG. 4 is a flowchart showing a defect detecting method according to the first embodiment.

FIG. 4 is a flowchart showing a defect detecting method according to the present embodiment.

In the defect detecting device 100, when measuring the surface of the measuring object W, first, the light source control unit 31 turns on the light source 11 of the illumination unit 10 (step S1; illumination step). Accordingly, the measuring object W is irradiated with the illumination light including a plurality of wavelengths corresponding to the defect size of a detection target from the light source 11.

Next, the spectral control unit 32 outputs a command signal to the filter drive circuit 241, and the wavelength of the illumination light transmitted through the spectral filter 22 is sequentially switched into a plurality of spectral wavelengths. Moreover, the imaging control unit 33 controls the camera drive circuit 242 to image the illumination light incident on the imaging element 23 every time the spectral wavelength of the spectral filter 22 is switched. That the spectral control unit 32 and the imaging control unit 33 capture the plurality of spectral images corresponding to the plurality of spectral wavelengths (step S2; imaging step).

Thereafter, the reflectance calculation unit 341 calculates reflectance of each pixel of each spectral image, and replaces the signal value of each pixel with the calculated reflectance (step S3). That is, in each spectral image captured by the imaging unit 20, the signal value of each pixel is a value corresponding to the amount of received illumination light, and is represented by, for example, 256 gradation values. However, the amount of light received when the illumination light is received by the imaging element 23 is a value in which the amount of light of each wavelength included in the illumination light is not taken into account, and whether or not the light diffusely reflected by the surface of the measuring object W is received cannot be properly determined. Therefore, the reflectance calculation unit 341 converts the gradation value of each pixel into reflectance in order to appropriately determine the presence or absence of the diffuse reflection.

In calculating the reflectance, spectral images having a plurality of spectral wavelengths with respect to a white reference plate is imaged in advance as a reference spectral image, and the reference is calculated by the ratio between the gradation value of each pixel of each spectral image captured in step S2 and the gradation value of each pixel of the reference spectral image. The white reference plate may be measured in advance by a calibration process performed before the measurement of the measuring object W, or the measurement result of the white reference plate may be stored in the storage device.

Then, the defect region detection unit 342 performs an edge detection process on the spectral image of each spectral wavelength and detects the edge region (step S4; detection step).

As described above, since the wavelength of the illumination light diffusely reflected by the defect differs depending on the defect size, not only the position of the defect at the surface of the measuring object W but also the defect size of the defect can be determined from the edge region detected by each spectral image, and the defect can be quantitatively measured.

Thereafter, the detection result output unit 343 generates and outputs a composite image obtained by combining each spectral image detected in step S4 (step S5).

Among the defects existing at the surface of the measure object W, with a defect having a small defect size, only diffuse reflection of illumination light having a short wavelength can be observed, and conversely, with a defect having a large defect size, diffuse reflection of illumination light having a short wavelength to long wavelength can be observed. This makes it possible to quantitatively measure the defect size of the defect in addition to the defect existing at the surface of the measuring object W.

Figure 5:
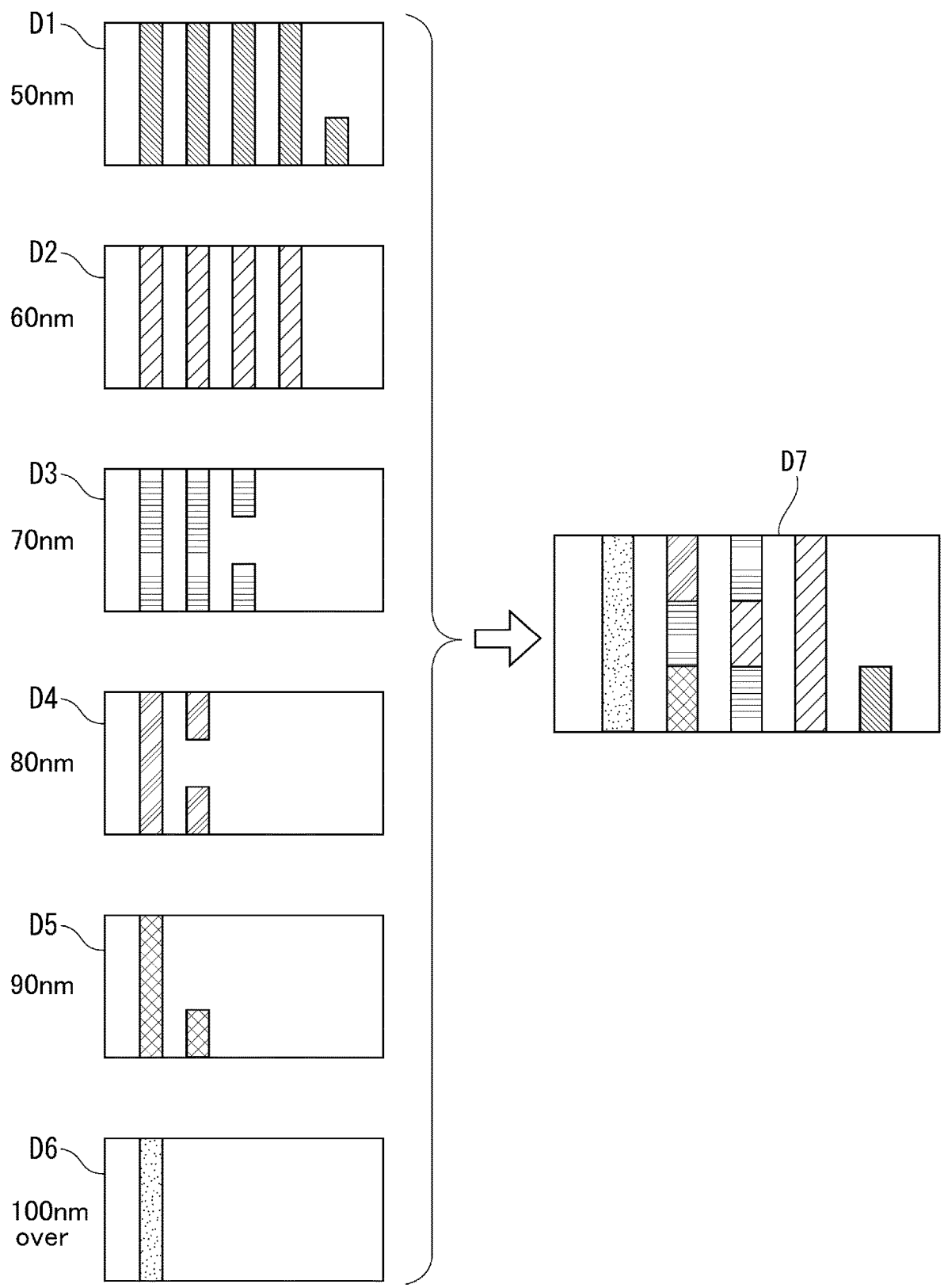
FIG. 5 is a diagram showing an example of an edge detection result for each spectral image and a generated composite image in the first embodiment.

FIG. 5 is a diagram showing an example of an edge detection result for each spectral image and a generated composite image.

In the example shown in FIG. 5, spectral images with an interval of 80 nm from 400 nm to 800 nm are captured using illumination light in the visible light region and the edge detection process is performed for each spectral image.

That is, the edge region detected in a spectral image D1 of 400 nm indicates the position of a defect having a defect size of 50 nm or more. The edge region detected in a spectral image D2 of 480 nm indicates the position of a defect having a defect size of 60 nm or more. The edge region detected in a spectral image D3 of 560 nm indicates the position of a defect having a defect size of 70 nm or more. The edge region detected in a spectral image D4 of 640 nm indicates the position of a defect having a defect size of 80 nm or more. The edge region detected in a spectral image D5 of 720 nm indicates the position of a defect having a defect size of 90 nm or more. The edge region detected in a spectral image D6 of 800 nm indicates the position of a defect having a defect size of 100 nm or more.

In this case, the defect only detected in the spectral image D1 of 400 nm and not detected in the other spectral images D2 to D6 is a defect having a defect size of 50 nm or more and less than 60 nm. The defect detected in the spectral images D1 and D2 of 400 nm and 480 nm and not detected in other spectral images D3 to D6 is a defect having a defect size of 60 nm or more and less than 70 nm. Thereafter, if defects are similarly determined, the defect size of defects from 50 nm to 100 nm can be determined at intervals of 10 nm. In the present embodiment, the defect size of less than 50 nm and 100 nm or more cannot be determined, but if a spectral image of an ultraviolet region of less than 400 nm, a near-infrared region of 800 nm or more, or an infrared region is imaged, the range of defect size that can be identified can be further expanded.

In step S5, the detection result output unit 343 generates a composite image D7 in which the spectral images D1 to D6 are superimposed and the edge regions are displayed in different display forms according to the defect size.

As a display form according to the defect size, for example, as shown in FIG. 5, a gradation image with lighter shades of color may be used as the defect size becomes smaller. The color of the edge region may be different depending on the defect size. Furthermore, when two defects having different defect size are adjacent to each other, a boundary line may be displayed at the boundary or a contour line corresponding to the defect size may be displayed.

Operational Effects of Present Embodiment

The defect detecting device 100 of the present embodiment includes the illumination unit 10 that irradiates the measuring object W with illumination light, the aging unit 20 that images the illumination light reflected by the measuring object W, and the control unit 30. The control unit 30 functions as the detection unit 34 which detects a defect at the surface of the measuring object W based on the captured image obtained by imaging the illumination light by the imaging unit 20. The captured image captured by the imaging unit 20 includes a plurality of spectral images having different spectral wavelengths, and the detection unit 34 detects a diffuse reflection region in which the illumination light is diffusely reflected from the spectral image corresponding to each spectral wavelength, and determines the defect size of the defect based on the spectral wavelength of the spectral image in which the diffuse reflection region is detected.

That is, the illumination light having the wavelength $\lambda$ is diffusely reflected when the standard deviation $R_h$ of the surface roughness is $R_h \geq \lambda/8$, and specularly reflected (totally reflected) when $0 < R_h < \lambda/8$. Therefore, if a diffuse reflection region is detected in each spectral image, a defect having a defect size of $\lambda/8$ or more can be detected. For this reason, if an edge region which is a diffuse reflection region is detected for each spectral image corresponding to each spectral wavelength, the defect size can be quantitatively measured even for a defect smaller than the pixel size of the imaging element 23.

In the present embodiment, the measuring object W is irradiated with illumination light in a wavelength region corresponding to the defect size from the illumination unit 10. That is, the illumination unit 10 irradiates the measuring object W with illumination light with light components having a plurality of wavelengths according to the defect size.

The imaging unit 20 has the spectral filter 22 which can switch a spectral wavelength, sequentially switches the spectral wavelength spectrally divided by the spectral filter 22, and captures a plurality of spectral images corresponding to the plurality of spectral wavelengths by imaging the light having the switched spectral wavelengths with the imaging element 23.

That is, in the present embodiment, the light reflected by the measuring object W is spectrally dived to capture a spectral image. In this case, compared to the case where the measuring object W is irradiated with light having a predetermined spectral wavelength and the reflected light is imaged by the imaging element 23, the inconvenience of light having a wavelength other than the spectral wavelength to be measured incident on the imaging element 23 can be suppressed. Therefore, a spectral image with high accuracy can be obtained, and the defect detection accuracy can be enhanced.

In the present embodiment, the detection unit 34 performs the edge detection process for the spectral image of each spectral wavelength and detects the diffuse reflection region as an edge region. Then, the detected edge regions are superimposed to generate a composite image in which the display form of the edge region is changed for each defect size.

Accordingly, the measurer can easily check the defect existing at the measuring object W and the defect size of the defect.

In the present embodiment, the imaging unit 20 is disposed a position separated from the specular reflection direction in which the illumination light from the illumination unit 10 is specularly reflected by the measuring object W. For example, as shown in FIG. 1, the illumination nit 10 irradiates the surface of the measuring object W with illumination light at an angle of 45°, and the imaging unit 20 is disposed in the normal direction of the surface of the measuring object W.

Accordingly, the illumination light specularly reflected by the measuring object W is not imaged by the imaging unit 20, and the illumination light diffusely reflected by the measuring object W can be imaged with high accuracy.

Second Embodiment

Next, the second embodiment will be described.

In the first embodiment, a so-called post-spectral process of imaging a plurality of spectral images corresponding to a plurality of spectral wavelengths by spectrally dividing the light reflected by the measuring object W with the spectral filter 22 provided inside the imaging unit 20 is performed. In contrast, a so-called pre-spectral process may be performed in which illumination light from the illumination unit is incident on the spectral element, and the measuring target W is irradiated with the transmitted illumination light having a predetermined spectral wavelength. In the second embodiment, a defect detecting device using the pre-spectral process will be described. In the following description, the already described items are denoted by the same reference numerals, and the description thereof is omitted or simplified.

Figure 6:
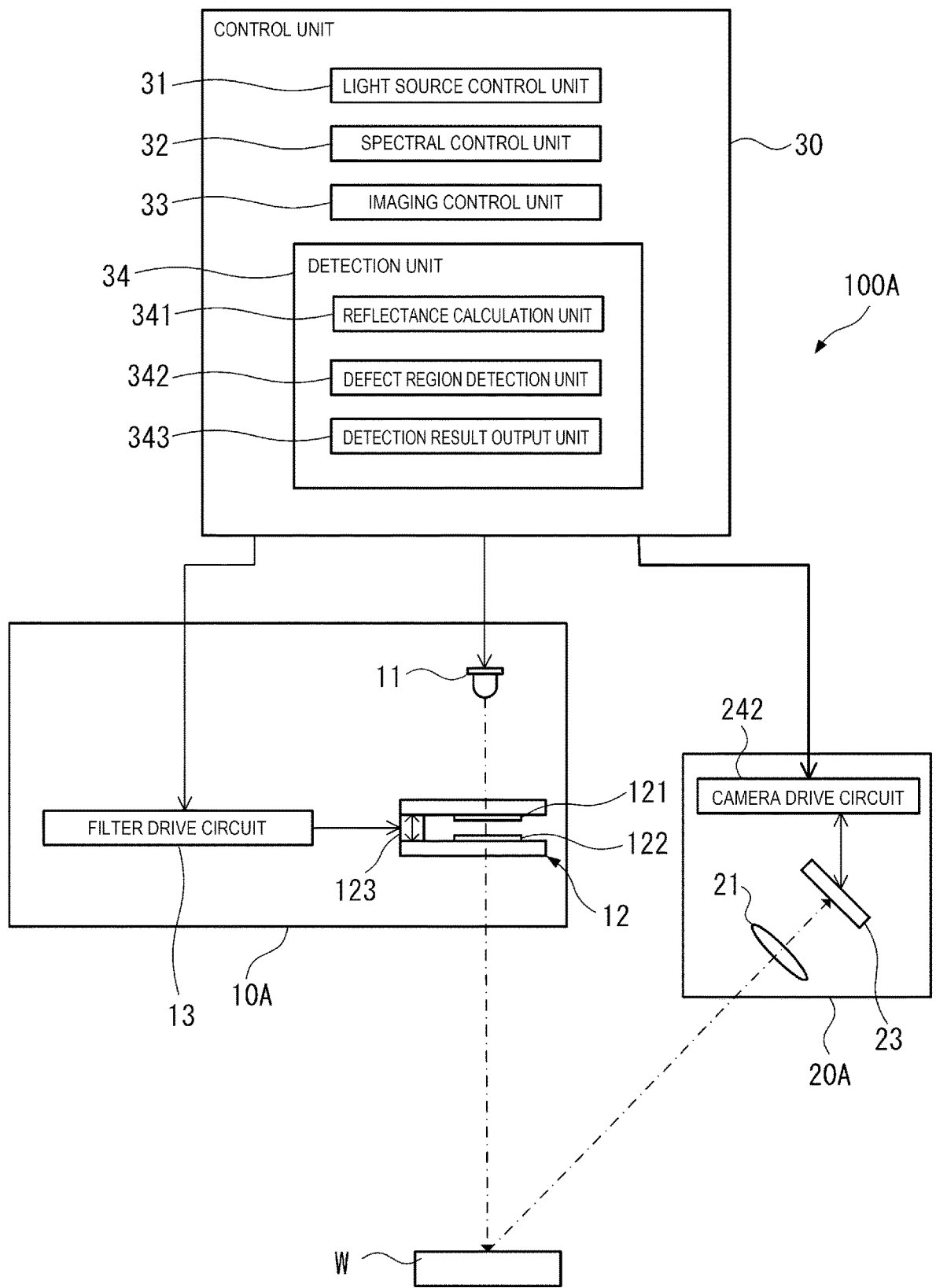
FIG. 6 is a schematic diagram showing a schematic configuration of a defect detecting device according to a second embodiment.

FIG. 6 is a schematic diagram showing a schematic configuration of a defect detecting device 100A according to the second embodiment.

In the present embodiment, as shown in FIG. 6, an illumination unit 10A, an imaging unit 20A, and the control unit 30 are provided.

The illumination unit 10A includes the light source 11, a spectral filter 12 which transmits light having a predetermined spectral wavelength from illumination light emitted from the light source 11, and a filter drive circuit 11.

The spectral filter 12 is a spectral element that transmits light having a predetermined spectral wavelength from the illumination light emitted from the light source 11. The spectral filter 12 is the same as the spectral filter 22 of the first embodiment. For example, a Fabry-Perot etalon including a pair of reflective films 121 and 122 and a gap changing unit 123 can be used. Moreover, the filter drive circuit 13 is the same as the filter drive circuit 241 of the first embodiment and controls the drive of the spectral filter 12.

On the other hand, in the present embodiment, since the measuring object W is irradiated with illumination light having a predetermined spectral wavelength, a spectral filter that further spectrally divides the reflected light is unnecessary in an environment on which no external light is incident. For this reason, the imaging unit 20A of the present embodiment is not provided with the spectral filter 22 as shown in FIG. 6.

In the present embodiment the illumination unit 10A is provided in the normal direction of the measuring object W, so that the illumination light reflected by the surface of the measuring object W at an angle of 45° is imaged by the imaging unit 20A. Even in this case, similarly to the first embodiment, the light specularly reflected by the measuring object W is not incident on the imaging unit 20A, so that the diffusely reflected light can be detected with high accuracy.

In the defect detecting device 100A of the second embodiment as described above, the illumination unit 10A is provided with the spectral filter 12, the measuring object W is irradiated with illumination light having a predetermined spectral wavelength, and the reflected light reflected by the measuring object N is imaged by the imaging unit 20A. Even in this case, similarly to the first embodiment, spectral images corresponding to a plurality of spectral wavelengths can be imaged, and the defect size of the defect at the surface of the measuring object N can be quantitatively measured.

Third Embodiment

Next, the third embodiment will be described.

The first and second embodiments describe an example in which the imaging units 20 and 20A are disposed at positions separated from the specular reflection direction of the illumination light using the illumination units 10 and 10A in which the light source 11 is a point light source.

In contrast, the third embodiment is different from the first and second embodiments in that ring illumination is used as the illumination unit.

Figure 7:
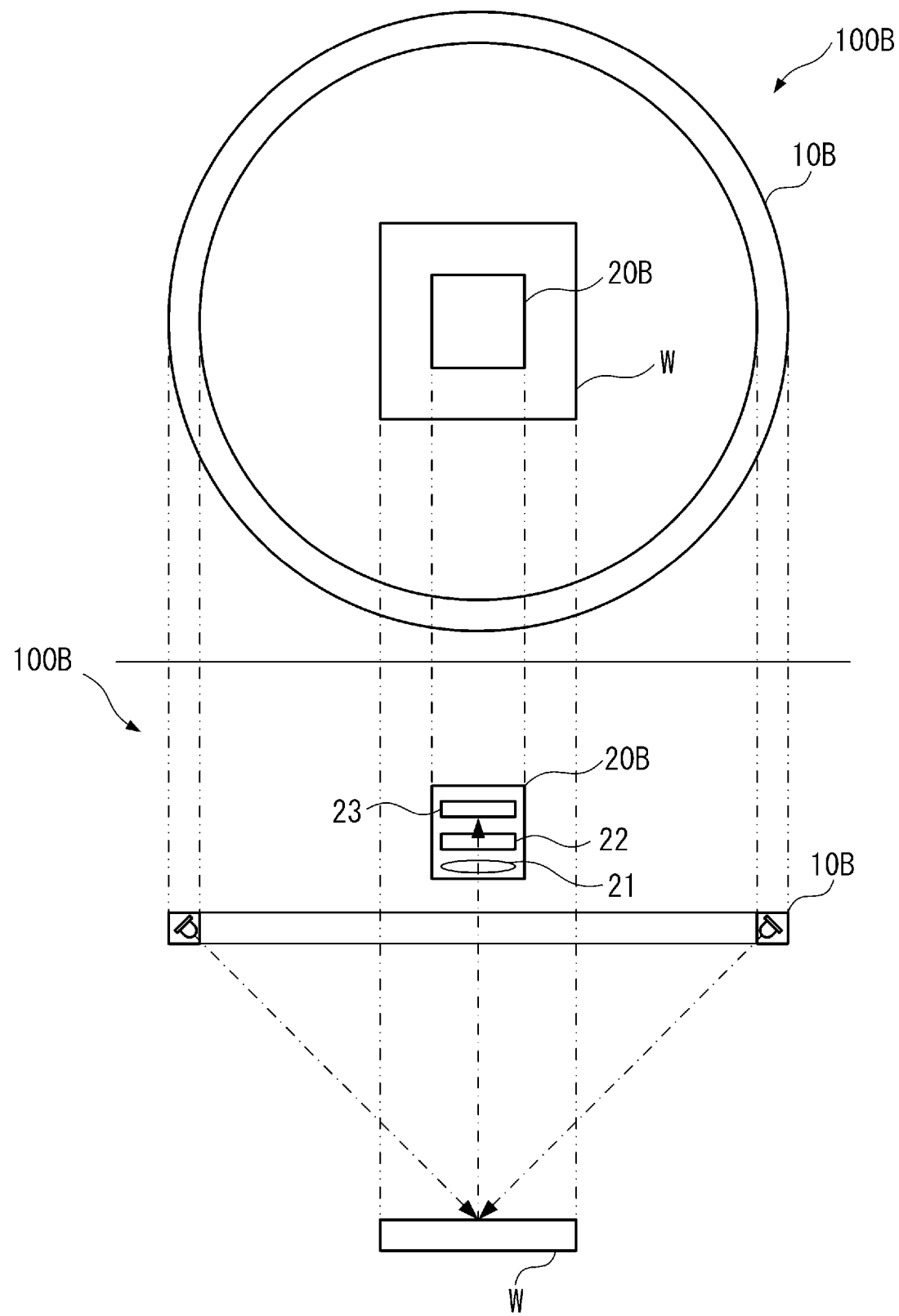
FIG. 7 is a diagram showing a disposal relationship between an illumination unit and an imaging unit of a defect detecting device according to a third embodiment.

FIG. 7 is a diagram showing a disposal relationship between an illumination unit 10B and an imaging unit 20B of a defect detecting device 100B according to the third embodiment.

As shown in the upper diagram of FIG. 7, the illumination unit 10B of the present embodiment is ring illumination formed in an annular shape when view from the normal direction of the measuring object W, and as shown in the lower diagram for FIG. 7, the illumination light is emitted toward the measurement center that is an intersection of an imaging axis of the imaging unit 20B and the measuring object W.

FIG. 7 shows an example in which the illumination unit 10B has an annular shape, but the illumination unit 10B may be formed in an annular shape, and may be formed in a polygonal annular shape, for example. When the annular shape of the illumination unit 10B is a polygon, it is more preferably an even regular polygon such as a square, a regular hexagon, or a regular octagon. That is, when viewed from the normal direction of the measuring object W, the measuring object W can be uniformly irradiated with light by forming point-symmetrical shape with the intersection of the imaging axis and the measuring object W as the center.

In the present embodiment as described above, the illumination unit 10B that is ring illumination can irradiate the measurement center of the measuring object W from the circumferential direction with illumination light. In this case, the amount of light when diffuse reflection occurs by the illumination light increases. Therefore, the edge detection process by the detection unit 34 increases the luminance difference between the diffuse reflection region and a region where no diffuse region occurs, and the defect position and the defect size can be detected with high accuracy.

Fourth Embodiment

Next, the fourth embodiment will be described.

In the third embodiment, an example of using ring illumination as the illumination unit 10B is shown. In contrast, in the fourth embodiment, diffuse illumination (dome illumination) is used.

Figure 8:
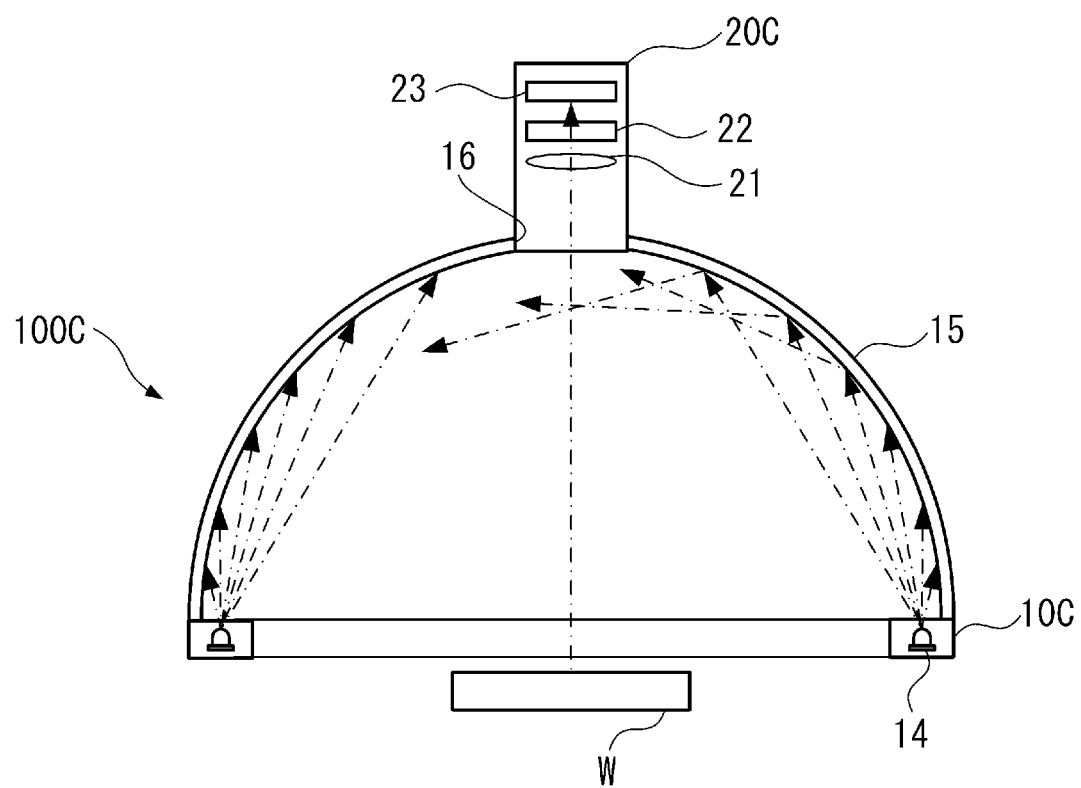
FIG. 8 is a schematic diagram showing an illumination unit and an imaging unit of a defect detecting device according to a fourth embodiment.

FIG. 8 is a schematic diagram showing an illumination unit 10C and an imaging unit. 20C of a defect detecting device 100C according to the fourth embodiment.

As shown in FIG. 8, the illumination unit 10C of the present embodiment irradiates the measuring object W with diffused light by reflecting the light emitted from a plurality of light sources 14 disposed along an annular frame by a dome 15 having a hemispherical reflection curved surface.

Moreover, in the normal direction of the measuring object W of the dome 15, a hole 16 which allows the light reflected by the measuring object W to pass therethrough, and the reflected light from the measuring object W that passed through the hole 16 is imaged by the imaging unit 20C.

In the present embodiment, the illumination unit 10C is dome illumination, and irradiates the measuring object W with illumination light having a uniform light amount distribution. In this case, the luminance unevenness of the spectral image caused by the unevenness of the light amount distribution of illumination light can be suppressed, and the defect detection accuracy can be enhanced.

MODIFICATION EXAMPLES

The present disclosure is not limited to the above-described embodiments, and modifications, improvements, and the like within the scope that can achieve the object of the present disclosure are included in the present disclosure.

Modification Example 1

For example, in the first embodiment, the detection unit 34 detects an edge region of each spectral image and detects the position and size of the defect on the assumption that the edge region is a diffuse reflection region at the surface of the measuring object W. In contrast, a spectral analysis process of analyzing the spectral spectrum information may be performed using the gradation value or reflectance of each pixel that can be obtained from a plurality of spectral images, and the position of the defect and the defect size may be determined based on the analysis result.

Examples of spectral analysis process include principal component analysis, spectral analysis based on Mahalanobis distance, differential analysis by differentiating pixel values by wavelength, and analysis based on spectral difference of each pixel.

In spectral analysis based on principal component analysis and Mahalanobis distance, the presence or absence of diffusely reflected light is determined by calculating the spectral spectrum in each pixel. That is, in the spectral analysis based on the principal component analysis or the Mahalanobis distance, it is possible to estimate the spectral spectrum with high accuracy by analyzing the light amount of the light components of each wavelength within the predetermined wavelength range. Here, when diffuse reflection occurs, the amount of light is greater than or equal to a threshold in the wavelength region below the predetermined wavelength corresponding to the defect size, and the amount of light becomes less than the threshold in the wavelength region of the predetermined wavelength or more. Therefore, the pixel included in the diffuse reflection region can be detected from the calculated spectral spectrum information. Moreover, the predetermined wavelength becomes the minimum wavelength of light that causes the diffuse reflection, and the defect size can be detected simultaneously with the detection of the diffuse reflection region. In such a spectral analysis process, defect detection based on waveform information of the spectral spectrum can be performed, and the defect size can be determined in more detail.

When differential analysis is used, a differential value obtained by differentiating a pixel value with respect to a wavelength, that is, a pixel in which a change amount of the pixel value with respect to a wavelength change is equal to or greater than a predetermined value is set as a defect position where diffuse reflected light is generated. The pixel value may be a gradation value of each pixel obtained by imaging the imaging unit 20, or may be reflectance calculated in step S3. Alternatively, the differential value may be calculated after the pixel value is normalized by the maximum pixel value or the minimum pixel value.

When diffuse reflection occurs, the amount of change in the pixel value increases before and after a predetermined wavelength according to the defect size, and the differential value also increases. Therefore, a pixel having a differential value equal to or larger than a predetermined value can be detected as a pixel corresponding to the defect, and the defect size can be detected based on the wavelength.

In the analysis result based on the spectral difference of each pixel, the diffuse reflection region is detected by comparing the spectral spectrum information of adjacent pixels. When there is a defect in the measuring object W and diffuse reflection occurs, the spectral information changes between adjacent pixels, and the amount of light increases in the pixel corresponding to the defect below the wavelength corresponding to the defect size. Therefore, when a spectral difference is calculated between adjacent pixels and the light quantity of one pixel is large below a specific wavelength, it can be determined as diffuse reflection, and the defect size can be determined based on the specific wavelength.

Modification Example 2

In the first embodiment, an example in which the imaging unit 20 is provided with the spectral filter 22 and the post-spectral process is performed is shown. In the second embodiment, the illumination unit 10A is provided with the spectral filter 12 and the pre-spectral process is performed. Both the post-spectral process and the pre-spectral process may be performed.

In this case, after narrowing the wavelength of the illumination light applied to the measuring object W by the pre-spectral process, the influence of the external light can be suppressed by the post-spectral process, and a spectral image for desired spectral wavelengths can be captured with higher accuracy.

Modification Example 3

In the second embodiment, the pre-spectral process is exemplified, but the illumination unit may have a light source having the spectral wavelength corresponding to the spectral wavelength of the spectral image to be captured. For example, a plurality of light sources may be provided at each output light of 400 nm, 480 nm, 560 nm, 640 nm, 720 nm, and 800 nm as single wavelength light. In this case, a plurality of light sources may be sequentially switched and turned on according to the spectral wavelength of the spectral image to be imaged, and the spectral filter 12 becomes unnecessary.

What is claimed is:

1. A defect detecting device comprising:
    an illumination unit that irradiates a measuring object with illumination light;
    an imager that images the illumination light reflected by the measuring object; and
    a detector that detects a defect at a surface of the measuring object based on a captured image obtained by imaging the illumination light by the imager, wherein
    the captured image includes a plurality of spectral images having different spectral wavelengths, and
    the detector
    (i) detects, based on the plurality of spectral images, at least one first spectral image in which a diffuse reflection region is detected and at least one second spectral image in which no diffuse reflection region is detected, the at least one first spectral image corresponding to at least one first spectral wavelength among the different spectral wavelengths, the at least one second spectral image corresponding to at least one second spectral wavelength among the different spectral wavelengths,
    (ii) determines whether the at least one first spectral wavelength is shorter than the at least one second spectral wavelength,
    (iii) after determining that the at least one first spectral wavelength is shorter than the at least one second spectral wavelength, identifies a longest spectral wavelength among the at least one first spectral wavelength of the at least one first spectral image in which the diffuse reflection region is detected, and
    (iv) determines a size of the defect based on the longest spectral wavelength.

2. The defect detecting device according to claim 1, wherein
    the illumination irradiates the measuring object with the illumination light including light components of a plurality of the spectral wavelengths, and
    the imager includes a spectral element that transmits light of a predetermined wavelength and is configured to change the wavelength of the transmitted light and an imaging element that receives the light transmitted through the spectral element, and captures the plurality of spectral images corresponding to the plurality of spectral wavelengths by switching the wavelength of the light transmitted through the spectral element to the plurality of spectral wavelengths.

3. The defect detecting device according to claim 1, wherein
    the illumination unit irradiates the measuring object with the illumination light of which the wavelength is switched to the plurality of spectral wavelengths, and
    the imager captures the plurality of spectral images corresponding to the plurality of spectral wavelengths by imaging the illumination light reflected by the measuring object each time the wavelength of the illumination light emitted from the illumination unit is switched.

4. The defect detecting device according to claim 1, wherein
    the detector detects the diffuse reflection region by performing an edge detection process on each spectral image and generates a composite image in which the plurality of spectral images are superimposed and a display form of the diffuse reflection region is changed according to the size of the defect.

5. The defect detecting device according to claim 1, wherein
    the imager is disposed at a position separated from a specular reflection direction in which the illumination light from the illumination is specularly reflected by the measuring object.

6. The defect detecting device according to claim 1, wherein
    the illumination is a ring illumination formed in an annular shape.

7. The defect detecting device according to claim 1, wherein
    the illumination is a diffuse illumination that irradiates the measuring object with diffused light.

8. A defect detecting method comprising:
    an illumination step of irradiating a measuring object with illumination light;
    an imaging step of imaging the illumination light reflected by the measuring object; and
    a detection step of detecting a defect at a surface of the measuring object based on the captured image, wherein
    in the imaging step, the captured image including a plurality of spectral images having different spectral wavelengths is captured, and the detection step includes
(i) detecting at least one first spectral image in which a diffuse reflection region is detected and at least one second spectral image in which no diffuse reflection region is detected, based on the plurality of spectral images, the at least one first spectral image corresponding to at least one first spectral wavelength among the different spectral wavelengths, the at least one second spectral image corresponding to at least one second spectral wavelength among the different spectral wavelengths,
(ii) determining whether the at least one first spectral wavelength is shorter than the at least one second spectral wavelength,
(iii) after determining that the at least one first spectral wavelength is shorter than the at least one second spectral wavelength, identifying a longest spectral wavelength among the at least one first spectral wavelength of the at least one first spectral image in which the diffuse reflection region is detected, and
(iv) determining a size of the defect based on the longest spectral wavelength.

9. A defect detecting device comprising:
an illumination unit that irradiates a measuring object with illumination light;
an imager that images the illumination light reflected by the measuring object; and
a control unit that detects a defect at a surface of the measuring object based on a captured image obtained by imaging the illumination light by the imager, wherein
the captured image includes a plurality of spectral images having different spectral wavelengths, and
the control unit
(i) detects, based on the plurality of spectral images, at least one first spectral image in which a diffuse reflection region is detected and at least one second spectral image in which no diffuse reflection region is detected, the at least one first spectral image corresponding to at least one first spectral wavelength among the different spectral wavelengths, the at least one second spectral image corresponding to at least one second spectral wavelength among the different spectral wavelengths,
(ii) determines whether the at least one first spectral wavelength is shorter than the at least one second spectral wavelength,
(iii) after determining that the at least one first spectral wavelength is shorter than the at least one second spectral wavelength, identifies a longest spectral wavelength among the at least one first spectral wavelength of the at least one first spectral image in which the diffuse reflection region is detected, and
(iv) determines a size of the defect based on the longest spectral wavelength.

* * * * *